UNITED STATES PATENT OFFICE.

CHARLES E. BAKER AND ARTHUR W. BURWELL, OF CLEVELAND, OHIO.

PROCESS OF TREATING ORES.

No. 841,103.        Specification of Letters Patent.        Patented Jan. 15, 1907.

Application filed March 1, 1905. Renewed July 5, 1906. Serial No. 324,793.

*To all whom it may concern:*

Be it known that we, CHARLES E. BAKER and ARTHUR W. BURWELL, citizens of the United States, residing at Cleveland, in the county of Cuyahoga and State of Ohio, have invented certain new and useful Improvements in Processes of Treating Ores, of which the following is a specification.

This invention is a process for the treatment of sulfid ores for the separation of sulfur and the production of the chlorid of the metal or metals of the ore.

The process will be particularly described as applied to the production of chlorid of copper from sulfid ores containing this metal; but the invention is applicable to sulfid ores in general. The term "ore" is employed as including concentrates and also matte and other compounds containing the metal in combination with sulfur.

The dry ore or matte containing the sulfid of copper is finely pulverized and brought into contact with sulfur chlorid, ($S_2Cl_2$.) The pulverized ore is preferably exposed in a revolving drum or other suitable reaction vessel to the vapor of sulfur chlorid, said vapor being either introduced from without or being produced in the reaction vessel by applying heat thereto. In either case the ore is preferably heated to hasten the reaction. The sulfur of the ore is replaced by the chlorin of the sulfur chlorid with the separation of sulfur from both of the reacting bodies in accordance with the equation $$2CuS + S_2Cl_2 = Cu_2Cl_2 + 4S.$$

We do not limit ourselves to any particular temperature for carrying out the reaction; but a moderate degree of heat is advisable. The separated sulfur may be tapped from the reaction vessel, or if the temperature be above the vaporizing-point of sulfur it may be distilled and recovered in any suitable condensing apparatus.

The metallic chlorid may be recovered as such or may be further treated for the separation of the metal. Cuprous chlorid, for instance, may be leached out by any of the usual solvents and separated from the solution, or the solution may be electrolyzed for the recovery of the metal.

We claim—

1. The process which consists in reacting with dry sulfur chlorid upon dry pulverulent sulfid ore at a suitable temperature, thereby separating sulfur and producing the chlorid of the metal or metals of the ore, substantially as described.

2. The process which consists in reacting with sulfur chlorid upon a dry pulverulent ore containing copper sulfid, at a suitable temperature, thereby separating sulfur and producing the chlorid of copper, substantially as described.

3. The process which consists in reacting with dry sulfur chlorid upon dry pulverulent sulfid ore at a suitable temperature, thereby separating sulfur and producing the chlorid of the metal or metals of the ore, extracting the metallic chlorid, and electrodepositing the metal, substantially as described.

4. The process which consists in reacting with sulfur chlorid upon a dry pulverulent ore containing copper sulfid, at a suitable temperature, thereby separating sulfur and producing chlorid of copper, extracting the chlorid of copper, and electrodepositing the metal, substantially as described.

In testimony whereof we affix our signatures in presence of two witnesses.

CHARLES E. BAKER.
ARTHUR W. BURWELL.

Witnesses:
HOWARD BAKER,
D. H. BOND.